(12) United States Patent
Foltin (10) Patent No.: US 9,586,515 B2
(45) Date of Patent: Mar. 7, 2017

(54) METHOD AND DEVICE FOR RECOGNIZING AN ILLUMINATED ROADWAY AHEAD OF A VEHICLE

(75) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 92 days.

(21) Appl. No.: 14/342,259

(22) PCT Filed: Jul. 5, 2012

(86) PCT No.: PCT/EP2012/063079
§ 371 (c)(1),
(2), (4) Date: Jun. 17, 2014

(87) PCT Pub. No.: WO2013/029841
PCT Pub. Date: Mar. 7, 2013

(65) Prior Publication Data
US 2014/0347872 A1 Nov. 27, 2014

(30) Foreign Application Priority Data
Aug. 31, 2011 (DE) .................... 10 2011 081 885

(51) Int. Cl.
*B60Q 1/14* (2006.01)
*G06K 9/00* (2006.01)

(52) U.S. Cl.
CPC ......... *B60Q 1/143* (2013.01); *G06K 9/00798* (2013.01); *G06K 9/00825* (2013.01);
(Continued)

(58) Field of Classification Search
CPC .............. B60Q 1/143; B60Q 2300/112; B60Q 2300/134; B60Q 2300/3321; B60Q 1/115;
(Continued)

(56) References Cited

U.S. PATENT DOCUMENTS

2007/0025112 A1* 2/2007 Kuhl .................... B60Q 1/10
362/466
2007/0221822 A1* 9/2007 Stein .................... B60Q 1/143
250/205
(Continued)

FOREIGN PATENT DOCUMENTS

DE 10 2009 028 342 2/2011
EP 2 116 958 A2 11/2009
WO WO 2011/015625 2/2011

OTHER PUBLICATIONS

International Search Report, PCT International Application No. PCT/EP2012/063079, dated Mar. 6, 2013.
(Continued)

*Primary Examiner* — Anne Hines
(74) *Attorney, Agent, or Firm* — Gerard Messina (57) ABSTRACT

A method for recognizing an illuminated roadway ahead of a vehicle, having a step of recognizing a first light object as a first roadway illumination unit. The method also includes a step of ascertaining a distance covered by the vehicle. The method also includes a step of recognizing a second light object as a second roadway illumination unit. The method also includes a step of providing a signal when the first roadway illumination unit and the second illumination unit have been recognized. The signal is provided using the distance covered, the signal representing a recognition of an illuminated roadway ahead of a vehicle.

12 Claims, 4 Drawing Sheets

(52) U.S. Cl.
CPC .. *B60Q 2300/112* (2013.01); *B60Q 2300/134* (2013.01); *B60Q 2300/3321* (2013.01)

(58) Field of Classification Search
CPC ...... B60Q 1/085; B60Q 1/10; G06K 9/00798; G06K 9/00825
See application file for complete search history.

(56) References Cited

U.S. PATENT DOCUMENTS

2010/0165102 A1* 7/2010 Klebanov .............. B60Q 1/115
348/135
2012/0203427 A1 8/2012 Ehlgen et al.

OTHER PUBLICATIONS

Kaeppeler, U., "Erkennung and Verfolgung von Leitpfosten zur Spurpradiktion," Dipolomarbeit Universitaet Stuttgart, Sep. 2003.

* cited by examiner

METHOD AND DEVICE FOR RECOGNIZING AN ILLUMINATED ROADWAY AHEAD OF A VEHICLE

FIELD

The present invention relates to a method for recognizing an illuminated roadway ahead of a vehicle, a device for recognizing an illuminated roadway ahead of a vehicle, and a corresponding computer program product.

BACKGROUND INFORMATION

Under European law, switching on the high beam in continuously illuminated areas is prohibited. When received light has an alternating current (AC) component or a certain frequency component, it may be concluded that roadway illumination is present. However, this requires a high scanning rate of the optical sensor for recognizing roadway illumination units of this type, which is only possible using a small image sensor. This approach is problematic not only due to the high scanning rate for camera systems, but also due to the increase in clocked light sources in automobiles. For example, LEDs are controlled by pulse-width modulation (PWM). "Chopping" and transforming, or clocking of the voltage, for example, may be used for stabilizing halogen light sources or for generating high voltage for xenon light sources.

Alternatively, the continuous illumination may be recognized by detecting urban areas/cities. For this purpose, speed limits (50 km/h, for example) may be used. Another option is to use map/navigation system information that indicates where a city begins; however, map material quickly becomes outdated for technical reasons. The recognition of cities does not correspond to the recognition of continuous roadway illumination, since intra-urban illuminated thruways or continuously illuminated freeways (such as in Belgium) are not recognized in this way. Switching on the high beam is prohibited on these roadways as well, even if they are not located in a city.

German Patent Application No. DE 10 2009 028 342 A1 describes a method for determining whether an area is illuminated. The method evaluates image data of a camera. The area is assessed as being illuminated if at least two stationary roadway illumination units are recognized based on the image data, and if these roadway illumination units have a spatial distance from one another.

SUMMARY

Against this background, the present invention provides an example method for recognizing an illuminated roadway ahead of a vehicle, and also an example device, using this method, for recognizing an illuminated roadway ahead of a vehicle, and lastly, a corresponding computer program product, according to the main claims. Advantageous embodiments result from the description below.

In accordance with the present invention, a roadway segment having continuous illumination may be recognized with the aid of a minimum number of roadway illumination units when the roadway illumination units are recognized from a vehicle within a maximum distance to be covered by the vehicle.

The present invention provides an example method for recognizing an illuminated roadway ahead of a vehicle, the method including:

recognizing a first light object as a first roadway illumination unit;
ascertaining a distance covered by the vehicle;
recognizing a second light object as a second roadway illumination unit; and
providing a signal when the first roadway illumination unit and the second roadway illumination unit have been recognized, the signal being provided using the distance covered, and the signal representing a recognition of an illuminated roadway ahead of a vehicle.

The present invention also provides an example device which is designed to carry out or implement the steps of the example method according to the present invention in appropriate units.

In this regard, the present invention provides an example device for recognizing an illuminated roadway ahead of a vehicle, the device including the following features:

a unit for recognizing a first light object as a first roadway illumination unit and a second light object as a second roadway illumination unit;
a unit for ascertaining a distance covered by the vehicle; and
a unit for providing a signal when the first roadway illumination unit and the second roadway illumination unit have been recognized, the signal being provided using the distance covered.

The object of the present invention may also be quickly and efficiently achieved by this embodiment variant of the present invention in the form of a device.

An illuminated roadway may be understood to mean a roadway segment that is continuously illuminated with roadway illumination units, and on which a vehicle may be expected to travel. The illuminated roadway may extend within a detection range of a camera of the vehicle in the driving direction ahead of the vehicle. The illuminated roadway may likewise extend at a distance from the vehicle at an edge of the detection range. For example, an illuminated roadway may be situated in an urban area. Likewise, an illuminated roadway may also be situated in a suburban area, for example an illuminated freeway segment. A light object may be a light source that is imaged on a sensor of the camera. A distance covered may be understood to mean a distance traveled. A signal may be understood to mean a piece of information. The signal may have at least two states, the first state representing a recognition of an illuminated roadway, and the second state representing that no illuminated roadway is recognized. The signal may be used to determine an adapted light distribution of headlights of the vehicle.

In the present context, a device may be understood to mean an electrical device which processes sensor signals and outputs control signals as a function thereof. The device may have an interface which may have a hardware and/or software design. In a hardware design, the interfaces may be part of a so-called system ASIC, for example, which contains various functions of the device. However, it is also possible for the interfaces to be dedicated, integrated circuits, or to be at least partially composed of discrete components. In a software design, the interfaces may be software modules which are present on a microcontroller, for example, in addition to other software modules.

The signal may be provided when the first roadway illumination unit is recognized over a distance which is greater than a first reference distance and/or when, upon recognition of the second roadway illumination unit, the distance covered is less than a second reference distance. By providing the signal after the second roadway illumination unit is recognized within the second reference distance, and after the first roadway illumination unit is recognized over the first reference distance, a continuously illuminated roadway segment may be recognized before the second roadway illumination unit is recognized, even if the first roadway illumination unit is obscured. The signal may be directly provided upon recognition of the second roadway illumination unit.

The signal may also be provided when, upon recognition of the second roadway illumination unit, an angle between a vehicle longitudinal axis and a direction from the first or the second roadway illumination unit is less than an angle threshold value, and the distance covered after recognizing the second roadway illumination unit is greater than a third reference distance. By awaiting the third reference distance, which may be equal to the first reference distance, the signal may be provided when the vehicle has approached the illuminated roadway segment. In this way, for example, premature dimming of the headlights prior to entering a city which is visible from afar may be avoided, and good illumination of the roadway ahead of the vehicle may be achieved. Likewise, in response to the recognition of the second roadway illumination unit, an advance signal may be provided which represents an expectation of soon reaching the illuminated roadway segment. In this way, for example, switching back to high beam may be suppressed after another vehicle has passed the vehicle shortly before traveling into a city.

The signal may also be provided when, upon recognition of the second roadway illumination unit, the angle between the vehicle longitudinal axis and the direction from the first or the second roadway illumination unit is greater than the angle threshold value, and the distance covered after recognizing the second roadway illumination unit is greater than a fourth reference distance. By awaiting a shortened fourth reference distance, the signal may be provided more quickly when, for example, traveling into the illuminated roadway segment in a city may be recognized late due to an obstruction.

The signal may also be provided when at least one further roadway illumination unit is recognized during the provision. As a result, the signal may be provided until the vehicle is present within the illuminated roadway segment.

The signal may also be provided when, subsequent to a non-recognition of a roadway illumination unit, a further roadway illumination unit is recognized when the distance covered after the non-recognition is less than a fifth reference distance. The signal may be discontinued when the distance covered after the non-recognition of a roadway illumination unit is greater than the fifth reference distance. A non-recognition may be understood to mean that no light object is recognized as a roadway illumination unit, for example, when one roadway illumination unit in a row of roadway illumination units is absent or is not recognizable. Likewise, the non-recognition may represent an absence of roadway illumination units, for example at an end of the illuminated roadway segment. By awaiting the fifth reference distance before the signal is no longer provided, erroneously turning up the headlights within the illuminated roadway segment, for example, may be avoided.

A further signal may be provided when another roadway illumination unit is recognized, and the distance covered after the non-recognition is less than a sixth reference distance, the further signal representing a recognition of an illuminated roadway ahead of a vehicle. By directly providing the further signal in response to a new recognition of a roadway illumination unit within the sixth reference distance, a response may be made particularly quickly when the distance covered between the recognized roadway illumination units has already resulted in discontinuation of the signal.

Also advantageous is an adaptation of parameters to the non-recognition (i.e., recognizing no continuous illumination), for example by adapting, in particular increasing, the fifth reference distance. An adaptation effect is thus achieved when the signal for the instantaneous roadway situation has been provided too early. This means that when the light is switched back to the original illumination characteristic too early, a longer period should be awaited the next time, since the overall distance from the roadway illumination unit may possibly be very large, or many obscurations are present.

The signal may be discontinued when a brightness of the surroundings is greater than a threshold value. Likewise, the fifth reference distance may be adapted as a function of the brightness of the surroundings in such a way that for a higher brightness level the signal is discontinued later, and/or for a low brightness level the signal is discontinued earlier. In this way, the headlights may be turned up more quickly in the darkness upon leaving the illuminated area.

In addition, according to one particular specific embodiment of the present invention, in the step of providing it is possible to not provide the signal when a brightness level of the surroundings is less than a threshold value. When it is very dark (i.e., a low brightness level prevails), the "continuous roadway illumination signal," for example, is not generated, since presumably no external roadway illumination is present.

The step of ascertainment may be discontinued when a yaw rate of the vehicle is greater than a yaw rate threshold value. The roadway illumination units may thus be ascertained more accurately, and in response to a non-recognition due to a sharp curve, the signal may continue to be provided even though the vehicle has already traveled a distance that is greater than the fifth reference distance.

According to another specific embodiment of the present invention, a method for controlling a light emission by headlights of a vehicle is provided, this method having the steps of the method according to one of the above-described specific embodiments, and a step of changing the light emission by the headlights in response to the signal. Such a specific embodiment of the present invention offers the advantage of very advantageous light control which assists the driver in optimally illuminating the roadway ahead of the vehicle without other road users being endangered, for example due to blinding by the headlights of the vehicle.

Also advantageous is a computer program product having program code which may be stored on a machine-readable carrier such as a semiconductor memory, a hard drive, or an optical memory, and used for carrying out the method according to one of the above-described specific embodiments when the program is executed on a computer or a device.

BRIEF DESCRIPTION OF THE DRAWINGS

The present invention is explained in greater detail below as an example, with reference to the figures.

DETAILED DESCRIPTION OF EXAMPLE EMBODIMENTS

In the following description of preferred exemplary embodiments of the present invention, identical or similar reference numerals are used for the elements having a similar action which are illustrated in the various figures, and a repeated description of these elements is dispensed with.

A recognition of continuous roadway illumination is also important when other high-beam assistant systems such as adaptive high-beam control (AHBC), which is related to the sliding headlight range control, or a glare-free high beam are to be used, since these systems may also be regarded as high-beam light distribution. The vehicle detection in darkness (VDD) algorithm recognizes streetlamps in the image, which may be utilized to recognize continuous roadway illumination.

A simple assumption that a "continuous roadway illumination signal" (with appropriate switchover to low beam or a special light distribution for city light) is generated as soon as roadway illumination has been recognized is not meaningful. Intersections/traffic circles exist which are equipped with streetlamps. These should not be recognized as continuous roadway illumination, since otherwise the low beam would have to be activated too frequently. Thus, roadway illumination is not always continuous.

The expanded assumption that a specific location is in a continuously illuminated area when more than one streetlamp is visible at the same time is likewise prone to major error. Multiple streetlamps are not necessarily in the visible range in a continuously illuminated area, since it is possible that a maximum of one streetlamp is visible due to obscurations in curves, etc. It is possible that sometimes there may be no streetlamp in the visual field within a continuously illuminated area (for example, at intersections, sharp curves, etc.).

Since streetlamps are self-illuminating light sources, they may be seen from a great distance. A premature recognition of the continuous roadway illumination results in (excessively) early switchover to low beam. The driver thus unnecessarily loses a valuable range of visibility.

Figure 1:
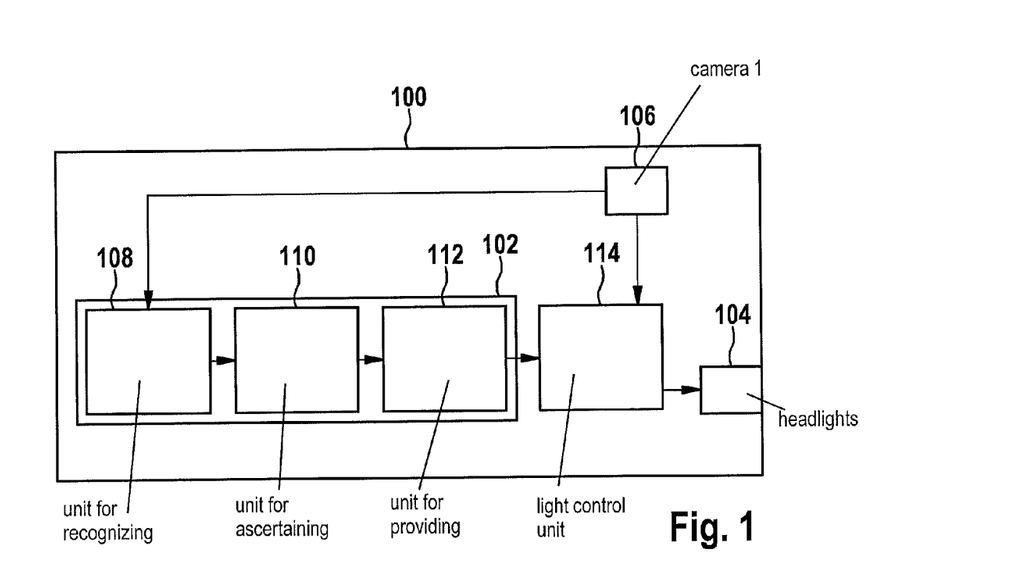
FIG. 1 shows an illustration of a vehicle having a device for recognizing an illuminated roadway according to one exemplary embodiment of the present invention.

FIG. 1 shows an illustration of a vehicle 100 having a device 102 for recognizing an illuminated roadway ahead of vehicle 100 according to one exemplary embodiment of the present invention. Vehicle 100 has headlights 104 and a camera 106. Device 102 has a unit for recognizing 108, a unit for ascertaining 110, and a unit for providing 112. Unit for recognizing 108 is designed to read in image data from camera 106 which represent an image of camera 106. When the image data depict at least one roadway illumination unit as a light object, the unit for recognizing 108 is designed to recognize the light object as a roadway illumination unit. Unit for ascertaining 110 is designed to ascertain a distance covered by vehicle 100. When unit for recognizing 108 has recognized a first roadway illumination unit, unit for ascertaining 110 thus begins to ascertain a distance covered by vehicle 100 while the first roadway illumination unit is recognizable in the image data. When unit for recognizing 108 recognizes a further roadway illumination unit, unit for ascertaining 110 provides the distance covered by vehicle 100 between the points of ascertaining, and also ascertains the instantaneous distance covered. Unit for providing 112 is designed to provide a signal when the first roadway illumination unit and the second roadway illumination unit have been recognized. A point in time of the provision is determined by using the distance covered. For example, the signal may be provided when the second roadway illumination unit is recognized after the first roadway illumination unit has been recognized at least for a length of a first reference distance, and the distance covered until recognizing the second roadway illumination unit is less than a second reference distance. Likewise, the signal may be provided when the second roadway illumination unit has been recognized, while the distance covered since recognizing the first roadway illumination unit is less than the first reference distance, and, subsequent to recognizing the second roadway illumination unit, vehicle 100 has covered a third reference distance. The signal is provided for a light control unit 114 which controls headlights 104. Light control unit 114 receives further information from other sources, in the present exemplary embodiment from camera 106, in order to control the light from headlights 104. The signal of control unit 102 is designed to influence light control unit 114 when vehicle 100 travels into and/or on a roadway segment having continuous roadway illumination, and/or leaves the roadway segment. Light control unit 114 then specifies an illumination scenario for headlights 104 which complies with legal requirements.

Figure 2:
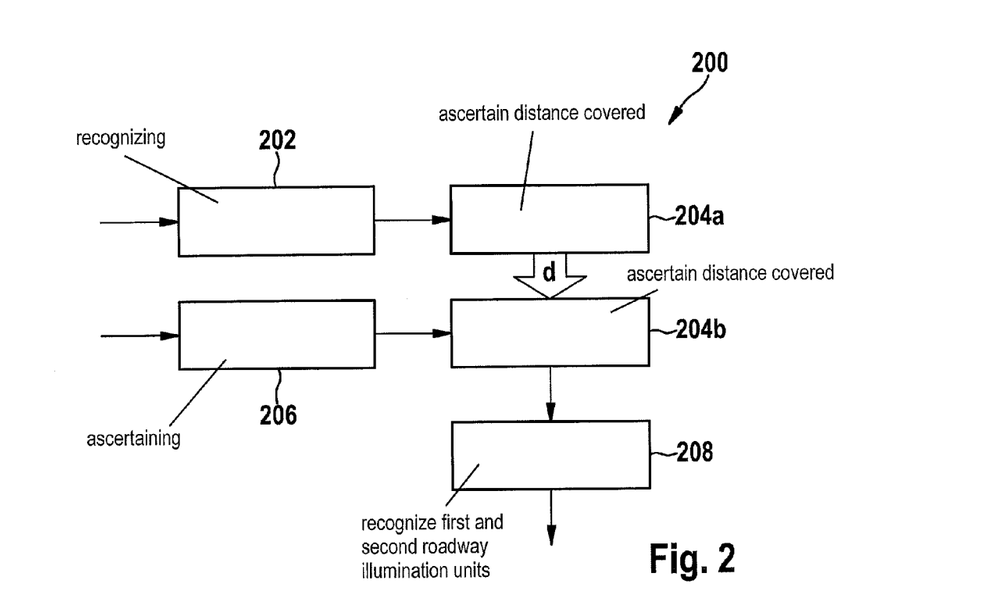
FIG. 2 shows a flow chart of a method for recognizing an illuminated roadway according to one exemplary embodiment of the present invention.

FIG. 2 shows a flow chart of a method 200 for recognizing an illuminated roadway ahead of a vehicle according to one exemplary embodiment of the present invention. Method 200 may be carried out in a device as illustrated in FIG. 1. Method 200 has a step of recognizing 202, a step of ascertaining 204, a further step of ascertaining 206, and a step of providing 208. A first light object is recognized as a first roadway illumination unit in step 202. When the first roadway illumination unit is recognized, an ascertainment of a distance d covered by the vehicle is started in step 204a. A second light object is recognized as a second roadway illumination unit in step 206. When the second roadway illumination unit is recognized, distance d covered is ascertained in step 204b. A signal is provided, using distance d covered, in step 208 when the first roadway illumination unit and the second roadway illumination unit have been recognized.

Figure 3:
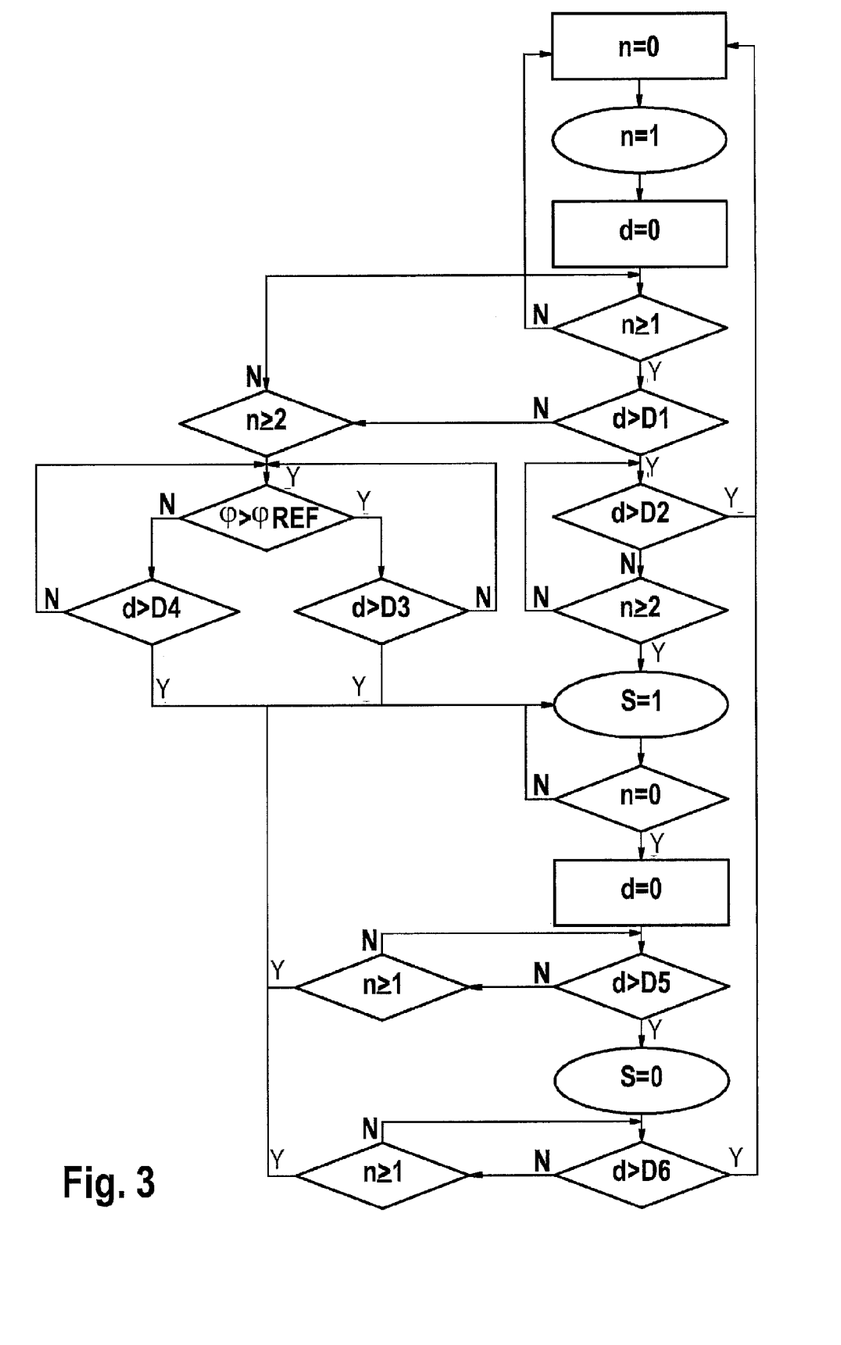
FIG. 3 shows a flow chart of a method for recognizing an illuminated roadway according to one exemplary embodiment of the present invention.

FIG. 3 shows a flow chart of a method for recognizing a continuously illuminated roadway with the aid of camera images of a camera of a vehicle according to one exemplary embodiment of the present invention.

When a first light object is recognized in camera images as a first roadway illumination unit, a counter n is set from zero to one. A distance meter for a distance d covered by the vehicle is set to a predefined value, in the present case zero, when the first roadway illumination unit is recognized. A counter reading of the distance meter increases until the first roadway illumination unit is recognized. The counter reading increases in proportion to distance d covered while the vehicle covers the distance.

When the first roadway illumination unit is no longer recognized, while distance d covered is less than a first reference distance D1, counter n is reset to zero.

When a second light object is recognized as a second roadway illumination unit, while distance d covered is less than first reference distance D1, counter n is set to two.

When a second light object is recognized as a second roadway illumination unit, and the first roadway illumination unit has been continuously recognized over a distance that is greater than first reference distance D1, and distance d covered is less than a second reference distance D2, a roadway illumination signal S is provided. Street illumination signal S is provided at least until at least one roadway illumination unit is recognized.

If no further roadway illumination unit is recognized, while distance d covered is less than second reference distance D2, counter n is reset to zero.

If the second roadway illumination unit is recognized, while distance d covered is less than first reference distance D1, the distance meter may be reset to the predefined value, in the present case zero.

If the roadway illumination unit has a smaller vertical angle $\phi$ with respect to the vehicle than a reference angle $\phi$REF, roadway illumination signal S may be provided when distance d covered is greater than a third reference distance D3.

If the first roadway illumination unit has a larger vertical angle $\phi$ with respect to the vehicle than reference angle $\phi$REF, roadway illumination signal S may be provided when distance d covered is greater than a fourth reference distance D4.

If a roadway illumination unit is no longer recognized, the distance meter is set to the predefined value, in the present case zero. The counter reading of the distance meter increases as long as the vehicle is moving.

Street illumination signal S may also be provided when distance d covered since the setting of the distance meter is less than a fifth reference distance D5, and a further light object is once again recognized as a roadway illumination unit.

Street illumination signal S may be discontinued when distance d covered is greater than fifth reference distance D5 and no further light object is recognized as a roadway illumination unit.

Street illumination signal S may be provided once again without delay when a further light object is recognized as a further roadway illumination unit, and distance d covered is less than a sixth reference distance D6.

Subsequently adapting parameters, in particular increasing fifth reference distance D5, has proven to be particularly advantageous, and may be carried out for a subsequent step of providing an adaptation to uncommon roadway and roadway illumination conditions.

If distance d covered since the setting of the distance meter is greater than sixth reference distance D6 and no further light object is recognized as a roadway illumination unit, counter n is reset to zero.

Figure 4A:
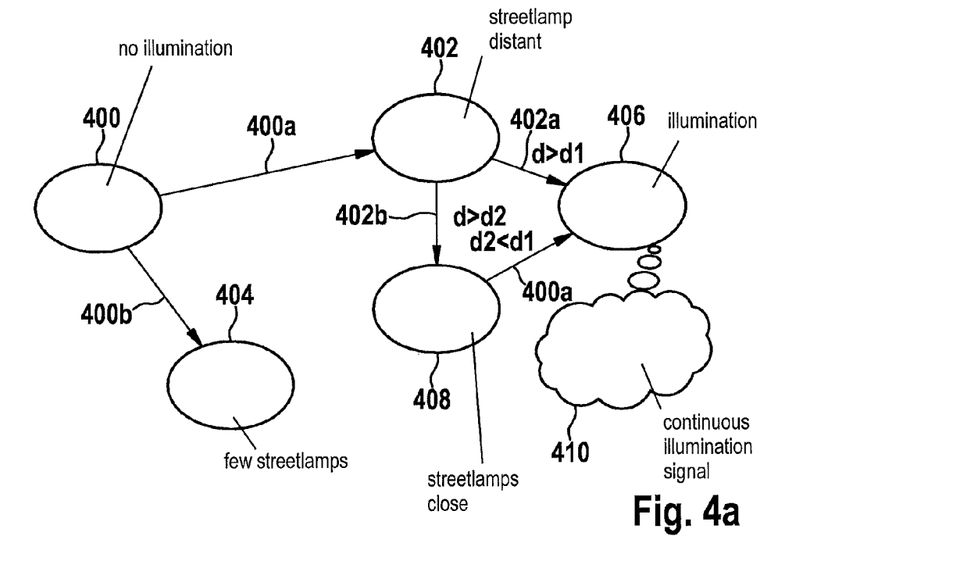
FIGS. 4a through 4c show Petri nets for method subsequences of a method for recognizing an illuminated roadway according to one exemplary embodiment of the present invention.
Figure 4B:
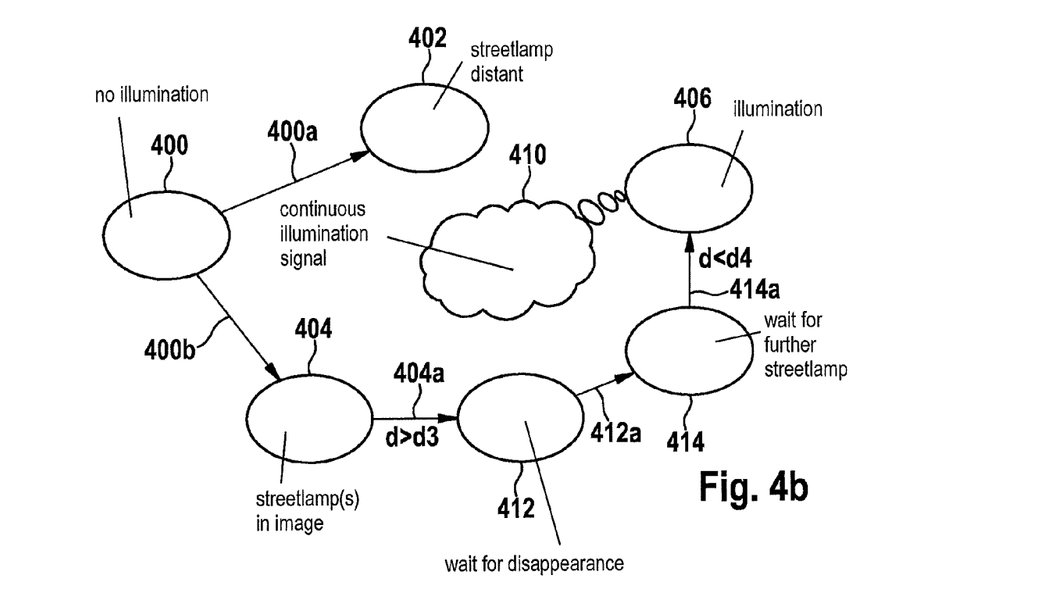
Figure 4C:
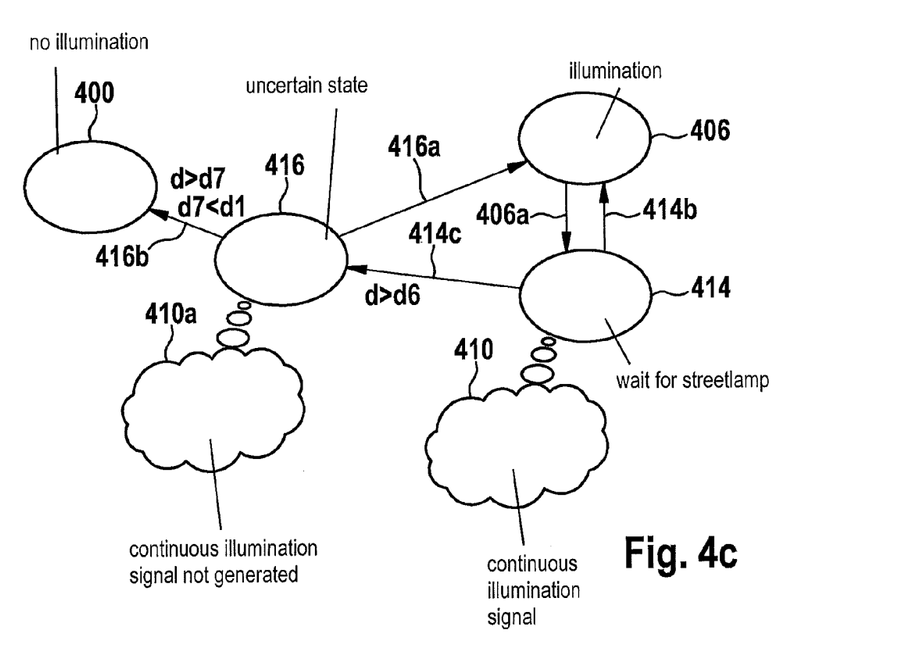

FIGS. 4a, 4b, and 4c show illustrations of Petri nets of multiple method components according to one exemplary embodiment of the present invention. A Petri net represents relationships among various states and conditions.

FIG. 4a shows a Petri net for the case that at least two roadway illumination units are recognized in rapid succession. The recognition of continuous roadway illumination is carried out (in a state-based manner) based on the number and position of the streetlamps in the image and their duration of visibility. Streetlamps are spaced apart at a fixed (but not defined) distance, since they are stationary objects. It is therefore advantageous to carry out the ascertainment of the duration of visibility based on the distance (distance measurement). The duration of visibility is thus independent of the vehicle speed (in contrast to time-based assessment of the duration of visibility). To recognize continuous roadway illumination, it is necessary to detect a minimum number of streetlamps within a certain distance. The distance varies depending on the configuration of the streetlamps.

FIG. 4a shows the case that multiple streetlamps (minimum number) are recognizable in the image. If the position of the streetlamps in the image is far to the top and/or the estimated distance is close, distance d necessary to generate a "continuous streetlamp signal" is reduced: it is likely that the vehicle is already situated directly prior to/in the continuously illuminated area in which use of the high beam is prohibited. The distance covered is measured independently of the position of the streetlamps. The "continuous roadway illumination signal" may thus be generated more quickly upon approaching a continuously illuminated area when the streetlamp increasingly shifts to a closer/higher position.

For example, two streetlamps (minimum number) are visible in the image. The roadway illumination signal is generated when these two streetlamps (or any other arbitrary number in the image) are continuously visible for 50 m (=d1). However, if at least one of the streetlamps is close enough to the vehicle (i.e., high enough in the image), the roadway illumination signal is generated after just 30 m (d2). If the streetlamps are present there after 49 m (d<d1, d>d2), the "continuous illumination signal" is immediately generated, since distance d traveled is not reset. The same applies for 31 m (<d1, >d2). If the streetlamps are close (pass-by signal) after 20 m, for example (<d2), the "continuous illumination signal" is not generated until after d2 lapses, i.e., after a further 10 m.

The starting point is a state 400 ("no illumination") in which no streetlamps are recognized. When a condition 400a ("sufficient streetlamps, start distance measurement d") is met, the method switches into a state 402 ("streetlamp distant") in which the streetlamps are recognized as distant. If a condition 400b ("too few streetlamps (<minimum number) appear)" is met, the method switches into a state 404 ("few streetlamps") in which few streetlamps are recognized. In state 402 the method switches into a state 406 ("illumination") in which continuous roadway illumination is recognized when condition 402a ("d>d1") is met that a distance traveled is greater than a first reference distance. When a condition 402b ("pass-by signal (streetlamp is close/high))" is met that the streetlamps are recognized at a vertical angle that is greater than a threshold angle, the method switches into a state 408 ("streetlamps close") in which the streetlamps are recognized as close. Starting from state 408, the method switches into state 406 when condition 408a ("d>d2"), where d2<d1, is met that the distance traveled is greater than a second reference distance, the first reference distance being greater than the second reference distance. When the method has reached state 406, "continuous illumination signal" 410 is generated.

FIG. 4b shows a further Petri net for the case that at least two roadway illumination units are recognized, the second roadway illumination unit being recognized only after the vehicle has covered a greater distance.

After the distance measurement has been started, in state 404 ("streetlamp(s) in image") a switch is made into a state 412 ("wait for disappearance") when a condition 404a ("d<d3") is met that distance d covered is greater than a third reference distance. In state 412, a switch is made into a state 414 ("wait for further streetlamp") when a condition 412a ("streetlamp has disappeared; restart distance measurement") has been met. In state 414 a switch is made into state 406 ("illumination") when a condition ("d<d4 and streetlamp has appeared") is met that distance d covered is greater than a fourth reference distance, and a roadway illumination unit has been recognized. When the method has reached state 406, "continuous illumination signal" 410 is generated.

If the streetlamp(s) disappear/disappears from the visible range in state 404 ("streetlamp(s) in image") before the measured distance is great enough for the switch into state 412 ("wait for disappearance"), a switch is made into state 400 ("no illumination"). The same applies if no streetlamp appears within distance d4 in state 414 ("wait for further streetlamps"). If the minimum number is greater than two, the number of streetlamps which have appeared and are continuously visible may be summed. If a new streetlamp does not appear within distance d4, a switch is made back to state 400 ("no illumination") or to an intermediate state if the individual distances of the streetlamps are separately tracked (each streetlamp has its own measured visibility distance). The allowable distance between the appearance of new streetlamps must not exceed distance d4.

FIG. 4c shows a further Petri net for the case that no further roadway illumination unit is recognized, and subsequently after a distance covered a further roadway illumination unit is recognized once again, for example when driving through an area having continuous roadway illumination in which at least one streetlamp is obscured.

Starting from state 406 ("illumination"), a switch is made into state 414 ("wait for streetlamp") when condition 406a ("no more streetlamps visible; start distance measurement") is met. "Continuous illumination signal" 410 continues to be generated in state 414. If condition 414b ("streetlamp") is met in state 414 that a roadway illumination unit is once again recognized, the method switches again into state 406. If condition 414c ("d>d6; restart distance measurement") is met in state 414 that the distance covered is greater than a sixth reference distance, the method switches into an indeterminate state 416 ("uncertain state") in which the "continuous illumination signal" 410a is not generated. This "uncertain state" is a state in which the system is not certain whether the vehicle has actually traveled out of an illuminated roadway area, or just that no roadway illumination unit has been recognized, for example because the next streetlamp is obscured by trees or is situated behind a curve or a crest in the roadway. If condition 416a ("streetlamp") in this state 416 is met that a roadway illumination unit is once again recognized, the method switches once again into state 406. If condition 416b ("d>d7 (where d7<d1))" in state 416 is met that the distance covered is greater than a seventh reference distance, the seventh reference distance being greater than the first reference distance, the method switches into state 400 ("no illumination").

If the vehicle has traveled out of an area having continuous roadway illumination, a "continuous roadway illumination signal" should no longer be generated. As soon as streetlamps are no longer visible over a certain distance, the "continuous illumination signal" is no longer generated. The distance measurement is started as soon as a streetlamp is no longer visible. If distance d traveled is greater than a predefined maximum distance without illumination, the signal is no longer generated. As soon as at least one streetlamp once again appears in the image, the distance measurement is stopped (and reset).

If the yaw rate of the vehicle is excessively high, the distance measurement is stopped (paused). The reason is that for a high yaw rate, there are many changes in the camera image, and it is possible that streetlamps may no longer be recognized. Additionally or alternatively, the curve radius may be evaluated and/or the steering angle together with the speed may be evaluated (on the basis of which the yaw rate may once again be deduced). Upon travel into a continuously illuminated area, a threshold for the yaw rate could likewise be used to generate the "continuous illumination signal" as quickly as possible, if needed.

When it is recognized that the vehicle has left the continuously illuminated area, an error is possible (for example, for an urban intersection having obscured streetlamps), and the high beam would be erroneously switched on. If the method had ended up in the "no illumination" state, the entire distance through the illuminated area would have to be traveled with the high beam switched on. Therefore, an indeterminate state 416 ("uncertain state") is initiated in which there is a concern that the absence of illumination has been incorrectly recognized. The "continuous illumination signal" is not generated in state 416 (high beam is possible). However, as soon as an individual streetlamp appears, a switch is immediately made into state 406 ("illumination"), and "continuous illumination signal" 410 is once again generated. In principle, similar debouncing behavior may be achieved without state 416 when the debouncing distance is appropriately increased (for example, total of d6+d7). State 416 is used, since in this way the distance until enabling the high beam may be shortened. Debouncing distance d6 is usually sufficient. Only in a few cases is it necessary to switch back to "continuous illumination" within d7. Switching back via the regular path (traveling into a continuously illuminated area) normally takes longer than switching back within distance d7 of state 416.

It is also possible to evaluate the distance from the streetlamps which is estimated by VDD so that, for example, crosswalks provided with multiple lights are not classified as continuous roadway illumination. The risk of erroneous detection may be reduced by recognizing traffic lights and/or intersections, since these could also be recognized as streetlamps by VDD. The visibility distance may additionally be combined via a minimum visibility duration (time) and/or a maximum visibility duration (time; for example, for streetlamps located far away) in order to improve the reliability of the detection. As a result, continuous roadway illumination which has been recognized as such only very briefly may be discarded.

Likewise, continuous roadway illumination which has been mistakenly recognized (far away, away from the roadway) may be reset if it has been recognized for a fairly long time but there is no approach to an illuminated area. Upon leaving the continuous illumination, the brightness of the surroundings may be included, or the brightness level in the area ahead of the vehicle may be taken into account. The brighter the surroundings, the longer the debouncing distance, and beginning at a certain brightness level the distance measurement is paused.

The brightness level in the field of expansion (the image area toward which the vehicle is traveling at that moment) may also be evaluated. By utilizing further sensors such as distance sensors, an approach to a (T) intersection may be recognized, and the debouncing time may be adapted accordingly and/or the measurement may be paused. When lane information is evaluated, the course of the roadway may be detected in an anticipatory manner. If the range of visibility on the roadway is high but no streetlamp is visible, the vehicle is traveling out of a continuously illuminated area. Likewise, the brightness of the surroundings/brightness on the roadway upon traveling into a continuously illuminated area may be utilized to shorten the debouncing distance (brightness level high) or to extend the debouncing distance (brightness level low), or to even completely prevent the debouncing distance (no change in brightness, for example because the light source is far away or away from the roadway).

The minimum number for recognizing the continuous roadway illumination may be a function of speed. In this way, at high speeds the situation may be prevented that the "continuous roadway illumination signal" is output for two, for example, laterally situated streetlamps on a freeway, which may actually be meaningful at a low speed (the travel time between two streetlamps increases with decreasing speed). Due to the high speed, freeways having continuous roadway illumination are then recognized as continuous roadway illumination only after a relatively large number of streetlamps. The debouncing distances may be selected as a function of speed, resulting in a distance dependency as well as a certain time dependency. For example, at a high speed the debouncing distances may be increased, since in that case streetlamps do not have to be as close together. The (estimated) height of a streetlamp may be incorporated into the debouncing distance, since on account of geometry, high streetlamps are able to illuminate a larger area than low streetlamps, which has the effect of a larger detection distance (for geometric obscuration). Streetlamps which disappear from the image too far from the side of the vehicle are not taken into account, since they do not contribute to the roadway illumination. Similarly, instead of the measured/ estimated distance, the height in the image (viewing angle) at which the streetlamp disappears from the image may be evaluated. The camera may be assisted by other sensors. For example, the streetlamp poles may be included in the evaluation using a LIDAR/radar system.

The "continuous illumination signal" (roadway illumination signal S) may be used for switching to low beam, or in general for changing the light distribution. The "continuous illumination signal" together with the vehicle speed, for example, may likewise be used to generate a city signal. The city signal may be used, for example, to set a special city light distribution. The city signal may be checked for plausibility via navigation information, or vice versa (for example, to check the up-to-dateness of map data). In addition to the "continuous illumination signal," an "approach to a continuous illumination signal" (approach signal) may be generated. In this case, instead of active switching to low beam as with the "continuous illumination signal," switching to high beam is prevented (since switching to low beam will take place shortly afterward). The approach signal is generated as soon as streetlamps are visible (optionally with prior checking of the distance and/or position). The approach signal prevents switching to full high beam to avoid having to rapidly switch back and forth between low beam and high beam, for example, when a continuously illuminated area is approached (comfort function). The illumination range should not be additionally reduced for the approach signal. It should also be possible to slightly increase the illumination range, whereby the increase should not be great enough that a reduction of the increased light distribution due to a subsequent response to a "continuous illumination signal" results in sacrifices in comfort (avoiding sacrifices in comfort due to rapid switching from high beam to low beam). The generated signals ("city signal," "continuous illumination signal," and "approach signal") may be communicated to other vehicles (optionally via a Car2x intermediary/infrastructure). After exchanging the information with two other vehicles, the vehicles may then make a 2-out-of-3 decision, for example (in general, an x-out-of-y decision). The signals of the vehicles may also be combined with one another: When an oncoming vehicle exchanges a "continuous illumination signal" (or "leaving continuous illumination signal"), the debouncing distance for traveling into a continuously illuminated area may be shortened, or an "approach signal" may be directly generated.

In other words, the approach presented here utilizes a distance measurement of a distance covered by the vehicle. In addition, a number, a distance, and an (image) position of roadway illumination units are used to adapt a debouncing distance. A yaw rate of the vehicle (optionally, a curve radius) may be used. An indeterminate state ("uncertain state") may be initiated to be able to quickly correct an error. An approach signal may be generated to prevent switching to high beam before traveling into a continuously illuminated area. Not all features are mandatory. For example, depending on the system design, the uncertain state, etc., may be dispensed with.

The recognition described herein does not (or does not necessarily) switch on city light; rather, it provides a signal which allows switching to low beam or prevents switching to high beam. A change in the debouncing distance is taken into account as a function of the position/movement of the streetlamps in the image. The recognition of continuous roadway illumination may be carried out in an anticipatory manner; passing-by and distance measuring is not necessary. If the streetlamps are far at the top in the image and move quickly enough (optional), the vehicle is traveling into the illuminated area (streetlamp is very close).

In the indeterminate state ("uncertain state"), after an unilluminated area has been recognized from an illuminated area (a city, for example), for a certain distance the debouncing distance is set to zero meters. The signal for the continuous roadway illumination is thus immediately reset as soon as a streetlamp appears in the image. The indeterminate state (uncertain state) is a follow-up function, the signal for continuous roadway illumination already having been cancelled and the "city signal" (which in general may also be understood to mean roadway illumination signal S) no longer being maintained. In conjunction with a recognized roadway illumination which is signaled by the roadway illumination signal, and a comparison of the vehicle speed to a speed limit, the "city signal" may be generated, which provides an indication that the vehicle is traveling on a roadway in a city, or in general, a developed area. For example, the city light may be switched off, and may be immediately switched back on when roadway illumination reappears.

The debouncing distance is a function of the intrinsic motion (in particular the yaw rate) or changes in the image. A high rate of change in the image results in poor detection performance, causing longer debouncing times (in the extreme case, of up to infinite length). The brightness level in an (image) area, in particular the field of expansion (FOE), may also be evaluated for anticipatory plausibility checking.

A distance measurement may be used to recognize a T intersection and to extend the debouncing distance for traveling out of the illuminated area (reflections of measuring signals on building walls). Estimating the range of visibility on the roadway is advantageous in order to recognize an end of the illumination in an anticipatory manner (when the roadway is straight, the range of visibility is high, and streetlamps are therefore visible early). An adaptation of the debouncing distance may thus be made. The structural height of the streetlamps may be utilized to adapt the debouncing distance (estimation of the illumination range of the streetlamp). An "approach signal" upon a (presumed)

approach to the city/continuously illuminated area may be provided, for example, in order to not switch to high beam (but not to actively switch to low beam). Likewise, a "departure signal" may be provided upon the presumed departure from the illuminated area.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, method steps according to the present invention may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for controlling a light emission by headlights of a vehicle, the method comprising:
    detecting, by a control unit processing at least one sensor signal, a first light object as a first roadway illumination unit at a first point;
    detecting, by the control unit processing at least one sensor signal, a second light object as a second roadway illumination unit at a second point;
    ascertaining, by the control unit, a distance covered by the vehicle between the first and second points;
    detecting, by the control unit and based on the ascertained distance covered, a characteristic of an illuminated roadway ahead of the vehicle; and
    responsive to the detection of the illuminated roadway, controlling, by the control unit, the headlights of the vehicle to change the light emission of the headlights.

2. The method as recited in claim 1, wherein the controlling includes outputting a signal responsive to at least one of: i) the first roadway illumination unit being detected over the distance which is greater than a first predetermined reference distance, and ii) upon detection of the second roadway illumination unit, the distance covered being less than a second predetermined reference distance.

3. The method as recited in claim 1, wherein the controlling includes outputting a signal responsive to, upon detection of the second roadway illumination unit, an angle between a vehicle longitudinal axis and a direction from the first or the second roadway illumination unit being less than a predetermined angle threshold value, and the distance covered after detecting the second roadway illumination unit being greater than a first predetermined reference distance.

4. The method as recited in claim 3, wherein the controlling includes outputting a signal responsive to, upon detection of the second roadway illumination unit, the angle between a vehicle longitudinal axis and a direction from the first or the second roadway illumination unit being greater than the predetermined angle threshold value, and the distance covered after detecting the second roadway illumination unit being greater than a second predetermined reference distance.

5. The method as recited in claim 1, wherein the controlling includes outputting a signal responsive to at least one further roadway illumination unit being detected.

6. The method as recited in claim 1, wherein the controlling includes outputting a signal responsive to, subsequent to a non-detection of roadway illumination units, a further roadway illumination unit being detected when the distance covered after the non-detection is less than a predetermined reference distance.

7. The method as recited in claim 6, wherein the controlling includes outputting a signal responsive to another roadway illumination unit being detected, and the distance covered after the non-detection being less than another predetermined reference distance, the signal representing the detection of the illuminated roadway ahead of a vehicle.

8. The method as recited in claim 6, wherein the controlling includes an adaptation of at least one parameter that represents the predetermined reference distance, the predetermined reference distance being increased responsive to the non-detection.

9. The method as recited in claim 1, wherein the controlling to change the light emission is not performed when a brightness of the surroundings is less than a predetermined threshold value.

10. The method as recited in claim 1, wherein the ascertaining step is discontinued when a yaw rate of the vehicle is greater than a predetermined yaw rate threshold value.

11. A device for controlling a light emission by headlights of a vehicle, the device comprising:
    at least one sensor;
    processing circuitry;
    an input; and
    an output;
    wherein the processing circuitry is programmed, by a hardwired configuration or by software, with a program that is executable by the processing circuitry and that, when executed by the processing circuitry, causes the processing circuitry to:
    detect, by processing at least one sensor signal obtained from the at least one sensor via the input, a first light object as a first roadway illumination unit at a first point and a second light object as a second roadway illumination unit at a second point;
    ascertain a distance covered by the vehicle between the first and second points;
    determine, based on the ascertained distance covered, a characteristic of an illuminated roadway ahead of the vehicle; and
    responsive to the detection of the illuminated roadway, control, via the output, the headlights of the vehicle to change the light emission of the headlights.

12. A non-transitory computer-readable storage medium storing program code that is executable by a processor and that, when executed by the processor, causes the processor to perform a method to control a light emission by headlights of a vehicle, the method comprising the steps of:
    detecting, by processing at least one sensor signal, a first light object as a first roadway illumination unit at a first point; detecting, by processing at least one sensor signal, a second light object as a second roadway illumination unit at a second point;
    ascertaining a distance covered by the vehicle between the first and second points;
    determining, based on the ascertained distance covered, a characteristic of an illuminated roadway ahead of the vehicle; and
    responsive to the determination of the illuminated roadway, controlling the headlights of the vehicle to change the light emission of the headlights.

* * * * *